(12) United States Patent
Chung et al.

(10) Patent No.: US 7,280,999 B2
(45) Date of Patent: Oct. 9, 2007

(54) NETWORK ADDRESS SERVER

(75) Inventors: Edmon Chung, North York (CA); David Leung, Richmond Hill (CA)

(73) Assignee: Neteka Inc. (CA)

( * ) Notice: Subject to any disclaimer, the term of this patent is extended or adjusted under 35 U.S.C. 154(b) by 125 days.

(21) Appl. No.: 10/155,225

(22) Filed: May 28, 2002

(65) Prior Publication Data

US 2003/0005157 A1  Jan. 2, 2003

Related U.S. Application Data

(63) Continuation-in-part of application No. PCT/CA00/01394, filed on Nov. 27, 2000.

(60) Provisional application No. 60/167,624, filed on Nov. 26, 1999.

(51) Int. Cl.
*G06F 17/30* (2006.01)
*G06F 7/00* (2006.01)
*G06F 12/00* (2006.01)

(52) U.S. Cl. .......................... 707/2; 709/223; 709/224; 709/225; 709/226; 709/243; 709/245; 709/246; 709/227; 709/204; 709/205; 709/206; 709/244

(58) Field of Classification Search .................... 707/2; 712/27; 709/243–245, 223–227, 204–206, 709/217, 200
See application file for complete search history.

(56) References Cited

U.S. PATENT DOCUMENTS 5,333,317 A   7/1994  Dann .......................... 395/600

(Continued)

FOREIGN PATENT DOCUMENTS

EP    0 565 850 A1   10/1993

(Continued)

OTHER PUBLICATIONS

K. Moore, "MIME (Multipurpose Internet Mail Extensions) Part Three: Message Header Extensions for Non-ASCII Text", XP-002175815, IETF/RFC 2047, Nov. 1996, pp. 1-15.

(Continued)

*Primary Examiner*—David Vincent
*Assistant Examiner*—Sunray Chang
(74) *Attorney, Agent, or Firm*—Katten Muchin Rosenman LLP (57) ABSTRACT

A network address server is configured to resolve a target network address name label with a network address, with the target address name label defining a branch of one level of a multi-level network address name space. The network address server is one of a plurality of network address servers each being uniquely associated with a respective region of the address name space level. The network server includes an address name database, and an address name processor in communication with the address name database for providing a response to a query for the network address corresponding to the target address name label. The address name database includes a number of database records, each identifying a unique address name label and a network address uniquely associated with the address name label. The address name processor includes a correlation processor, a correlation transceiver in communication with the correlation processor, and a response processor in communication with the correlation processor and the correlation transceiver. The correlation processor is configured to determine a correlation between the target address name label and the respective unique address name region. The correlation transceiver is configured to provide the other network address servers with a respective indication of the determined correlation and for receiving a corresponding correlation indication from at least one of the other network address servers. The response processor is configured to provide a response to the query in accordance with the correlation indications.

22 Claims, 6 Drawing Sheets

U.S. PATENT DOCUMENTS

| | | | |
|---|---|---|---|
| 5,864,854 A * | 1/1999 | Boyle | 707/10 |
| 6,016,512 A * | 1/2000 | Huitema | 709/245 |
| 6,038,599 A * | 3/2000 | Black et al. | 709/223 |
| 6,092,178 A * | 7/2000 | Jindal et al. | 712/27 |
| 6,314,469 B1 * | 11/2001 | Tan et al. | 709/245 |
| 6,446,133 B1 * | 9/2002 | Tan et al. | 709/245 |
| 7,136,901 B2 * | 11/2006 | Chung et al. | 709/206 |
| 2003/0046353 A1 * | 3/2003 | Chung et al. | 709/206 |

FOREIGN PATENT DOCUMENTS

| | | |
|---|---|---|
| WO | WO 00/50966 | 8/2000 |

OTHER PUBLICATIONS

J-C. Bolot, et al., "Evaluating Caching Schemes for the X.500 Directory System", Proceedings of the 13th International Conference on Distributed Computing Systems, Pittsburgh, PA. XP-000399379. May 25-28, 1993, pp. 112-119.

B. Smetaniuk, "Distributed Operation of the X.500 Directory", Computer Networks and ISDN Systems, vol. 21, No. 1, (XP-000177093), Mar. 1991, pp. 17-40.

* cited by examiner

NETWORK ADDRESS SERVER

RELATED APPLICATIONS

This application is a continuation-in-part of international application PCT/CA00/01394 filed Nov. 27, 2000, which is a continuation-in-part of U.S. provisional application No. 60/167,624 filed Nov. 26, 1999.

FIELD OF THE INVENTION

The present invention relates to a system and method for facilitating communication between domains of a wide area network. In particular, the present invention relates to a network server for associating network address names with physical network addresses.

BACKGROUND OF THE INVENTION

In order to facilitate communication between communication devices over a network, each network device is typically assigned a unique numeric network address. A user associated with one of the network devices then need only provide the network transport layer with the numeric network address of the intended target to communication with the target. Although this system functions satisfactorily in small network where users only communicate with a small number of network communication devices, the system cannot be readily transported to large networks since it would require each network user to remember a large number of unique numeric network addresses. For this reason, the domain name system (DNS) was proposed by Mockapetris in 1987 (RFC 1034 and RFC 1035, Network Working Group; presently available at "http://www.ietf.org") as a mechanism for facilitating communication between communication devices over the Internet.

The DNS facilitates Internet communication by associating domain names with the numeric (IP, "Internet Protocol") network addresses. The DNS basically consists of resource records, domain name servers, and resolvers. Each resource records includes information concerning each network node, including the IP address of the network node, and the domain names associated with the IP address. Together, the resource records provide the Internet with a tree-structured domain name space. Domain name servers are Internet servers which retain information concerning the domain name space. In particular, each domain name server has a file ("zone file") which retains resource records associated with its own subset of the domain name space. These records are referred to as "authoritative" records. Also, through queries from resolvers, domain name servers also temporarily cache copies of resource records acquired from other domain servers in order to improve the performance of the retrieval process when non-local data is requested by a resolver. Resolvers are local programs which extract information from domain name servers in response to client requests.

Typically, the domain name associated with a network device at particular IP address has a top level label field, and one or more lower level label fields. The label fields comprising a domain name are separated from one another through a delimiter ("."), and are each positioned in the domain name according to their respective relative levels in the domain name hierarchy. To access a particular network device (including transmitting an e-mail message to a recipient having an e-mail account subsisting at a remote network device) a user provides a resolver, through an Internet browser, with the domain name associated with the target network device. The resolver queries a root DNS server with the top level label identified in the domain name to obtain the IP address of the DNS server which has the zone file associated with the top level domain. The resolver then accesses the identified DNS server using the obtained IP address, and with the label occupying the next highest position in the domain name hierarchy (the label immediately to the left of the top level label in the domain name) obtains the IP address of the DNS server which has the zone file associated with the queried label. The process continues until each label in the domain name has been resolved, at which point the last queried DNS server provides the resolver with the IP address of the network device having the specified domain name. Although the DNS has been implemented successfully worldwide, it suffers from at least three main deficiencies.

First, the domain names implemented by the DNS must follow the rules for ARPANET host names. Consequently, each label must begin and end with a "letter" or one of the numbers 0 to 9, and contain only "letters", the numbers 0 to 9 or a hyphen in between. Further, each "letter" can only be one of 'A' to 'Z' and 'a' to 'z'. As a result, the number of domain names available is severely limited. Second, the DNS system is case insensitive, so that two domain names which have identical spellings but whose component letters do not correspond in terms of their respective cases, will resolve to the same network address. As will be apparent, this requirement further limits the number of domain names which can be used. Third, since the resource records for each sub-domain are stored in zone files, the number of domains names and the speed of the resolving process is limited by the hardware restrictions of the domain name servers.

Although e-mail systems existed long before the DNS was established, the problems inherent with existing e-mail systems closely parallel those of the DNS. In particular, most e-mail system only accept, for inclusion as part of an e-mail account name, the hyphen, the numbers 0 to 9 and the letters 'A' to 'Z' and 'a' to 'z', thereby limiting the number of account names available. Again, most e-mail systems are also case insensitive, further limiting the number of account names available.

Attempts have been made to resolve some of the deficiencies of the existing network address naming systems. For instance, RealNames (www.realnames.com) and iDNS (ww.idns.org) have proposed modifications to the existing domain name system which attempt to expand upon the number of domain names available. Both systems would allow users to enter a domain name into the URL field of their browser, without the name following the rules for ARPANET host names. For instance, subscribers could enter into their Internet browser a domain name which includes symbols, and/or letters from non-English language character sets. The domain name would be transmitted to a proprietary RealNames or iDNS server which would then translate the domain name into an ARPANET-compliant domain name for resolution by the existing DNS. As will be apparent, these solutions could cause a computation bottleneck since each domain name would have to be translated first by their proprietary servers prior to resolution by a domain name server. Further, these solutions would not be suitable for e-mail addresses since the portion of the e-mail address identifying the originator and recipient of the e-mail message would still need to be translated by the recipient's e-mail POP3 server.

Microsoft Corporation has proposed a solution (http://search.ietf.orf/internet-drafts/draft-skwan-utf8-dns-0.2.txt) which would increase the size of the character set available for domain names. According to the proposal, DNS packets would be migrated from the existing ASCII format to the UTF-8 format. However, this latter solution would require that all Internet browsers be updated before domain names employing UTF-8 characters were used since UTF-8 characters are encoded using a double-byte structure. Consequently, a domain name server, implemented using BIND for example, would incorrectly interpret a UTF-8 character received from a conventional browser as two characters instead of one, resulting in an incorrect resolution of the domain name.

Therefore, there remains a need for a network address naming system which expands upon the number of domain names available, without creating computational bottlenecks and without requiring significant changes to existing browser software. Further, there remains a need for a network address naming system which expands the size of the character set available for the account name component of e-mail addresses.

SUMMARY OF THE INVENTION

According to a first aspect of the present invention, there is provided a network address server and a method for resolving a target network address name with a network address, which address deficiencies of the prior art network address naming systems.

The network address server, according to the first aspect of the invention, is configured to resolve a target address name label with a network address, with the target address name label defining a branch of one level of a multi-level network address name space. The network address server is one of a plurality of network address servers each being uniquely associated with a respective region of the address name space level. The network address server includes an address name database, and an address name processor in communication with the address name database for providing a response to a query for the network address corresponding to the target address name label. The address name database includes a number of database records, each identifying a unique address name label and a network address uniquely associated with the address name label. The address name processor includes a correlation processor, a correlation transceiver in communication with the correlation processor, and a response processor in communication with the correlation processor and the correlation transceiver. The correlation processor is configured to determine a correlation between the target address name label and the respective unique address name region. The correlation transceiver is configured to provide the other network address servers with a respective indication of the determined correlation and for receiving a corresponding correlation indication from at least one of the other network address servers. The response processor is configured to provide a response to the query in accordance with the correlation indications.

The method for resolving a target network address name, according to the first aspect of the invention, includes the steps of (1) receiving at a first network address server a query for the network address corresponding to the target address name label, the first network address server being one of a plurality of network address servers each including database records defining a unique region of the address name space level, each database record associating a unique address name label with a corresponding network address; (2) at the first network address server determining a correlation between the received target address name label and the respective unique address name region; (3) at the first domain name server providing the other network address servers with a respective indication of the correlation and receiving corresponding correlation indications from at least one of the other network address servers; and (4) at the first network address server providing a response to the query in accordance with the correlation indications.

According to a second aspect of the present invention, there is provided a method for resolving network address names which addresses deficiencies of the prior art network address naming systems. The method for resolving network address names, according to the second aspect of the invention, includes the steps of (1) providing a plurality of network address servers for mapping a hierarchical network address name space, the hierarchical address name space having a number of levels, each network address server including database records defining a unique subset of a respective level of the address name space, each database record associating a unique address name with a corresponding network address; (2) receiving a target address name for resolving, the target address name including a number of address name labels, each address name label being associated with one of the subsets of a respective one of the address name space levels; and (3) for each address name label querying at least one of the network address servers defining the associated address name space level.

According to a third aspect of the present invention, there is provided a data packet for resolving a target network address name label with a network address. The data packet, according to the third aspect of the invention, includes at least one address name character identifying the target address name label (with the at least one address name character having an address name character set type), and an address name identifier identifying the address name character set type.

According to a fourth aspect of the present invention, there is provided a network address name database for resolving a target address name label with a network address. The address name database, according to the fourth aspect of the invention, includes at least one database record, each including an address name label identifying a network address name (with the address name label including at least one record character having a record character set type), a record character set identifier identifying the record character set type, and a network address uniquely associated with the address name label.

In a preferred embodiment of the invention, the network address server comprises a domain name server for resolving a target domain label with a network address. Each domain name server has a correlation indication response time, and the domain name server which returns the response to the query has the shortest of the correlation indication response times. Preferably, each database record includes at least one record character leaving a record character set type, and a record character set identifier identifying the record character set type. The target domain name label includes at least one domain name character having a domain name character set type, and a domain name character set identifier identifying the domain name character set type. The correlation processor determines the correlation between the target domain name label and the respective unique domain name region by querying the respective database records with the target domain name label, and obtaining a correlation of the domain name characters and the associated domain name character set identifier with each database record of record characters and the associated record character set identifier.

Further, the domain name label of each database record is associated with a hash code derived from a hashing function which uniquely associates the derived hash code with the corresponding domain name label. The correlation processor includes a hash code processor for encoding the target domain name label with the hashing function, and a search engine in communication with the correlation processor for querying the hashed database records with the hashed domain name label. The correlation processor obtains the correlation by encoding the target domain name label with the hashing function, and querying the hashed database records with the hashed domain name label.

BRIEF DESCRIPTION OF THE DRAWINGS

The preferred embodiment of the invention will now be described, by way of example only, with reference to the drawings, in which.

DETAILED DESCRIPTION OF THE PREFERRED EMBODIMENT

Figure 1:
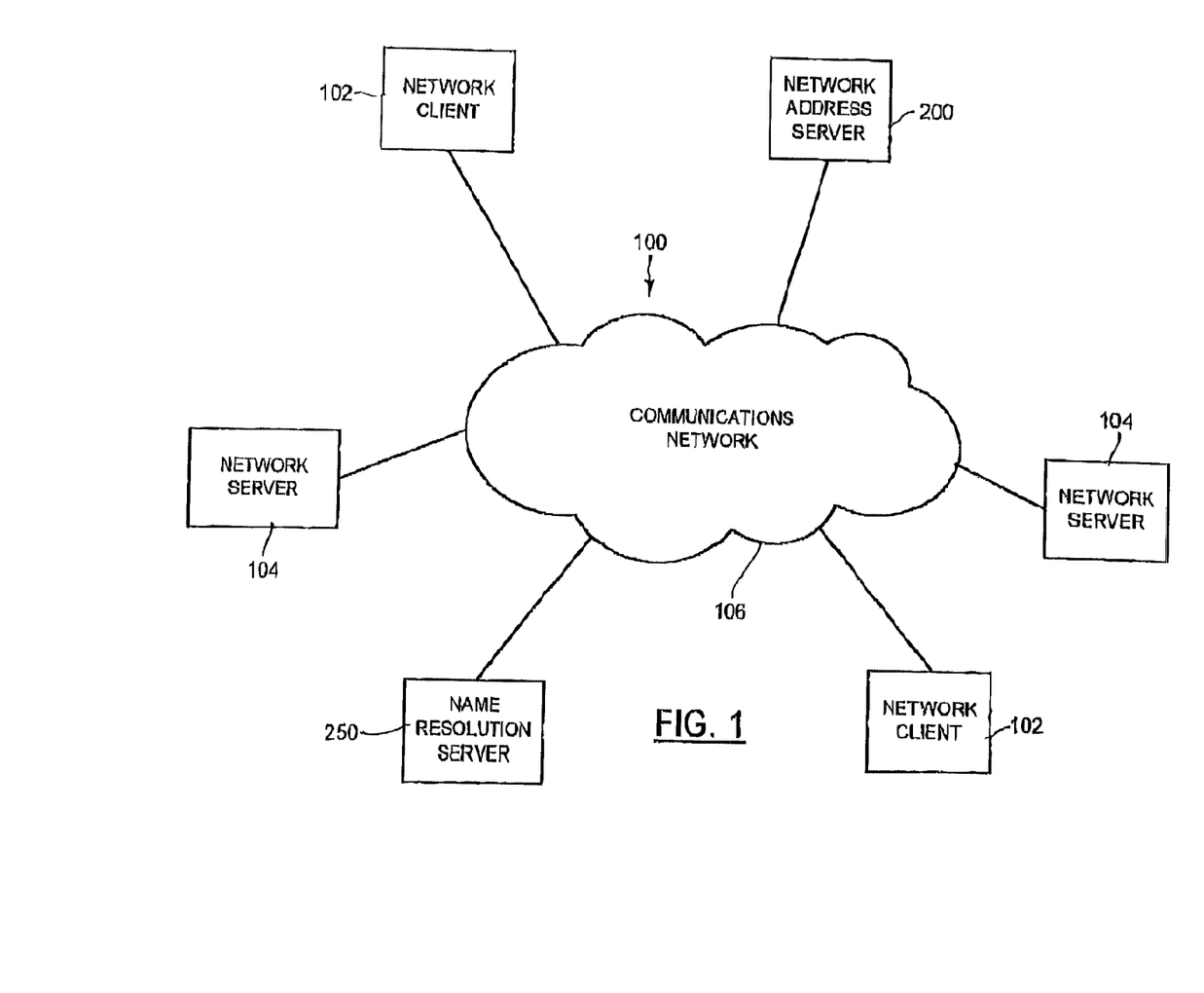
FIG. 1 is a schematic view of network address name resolution system, according to the present invention, depicting a plurality of network clients, a plurality of network address servers, and a communications network interconnecting the network clients and the network address servers.

Turning to FIG. 1, a network address name resolution system, denoted generally as 100, is shown comprising a plurality of network clients 102, a plurality of network servers 104, a plurality of network address servers 200, a plurality of name resolution servers 250, and a communications network 106 interconnecting the network clients 102, the network servers 104, the network address servers 200 and the name resolution servers 250. Preferably, each network client 102 comprises a personal computer equipped with software for communicating with the network servers 104 over the communications network 106.

Typically, the communications network 106 comprises the Internet, however the communications network 106 may also comprise other network forms, such as an intranet. Further, although the network address name resolution system 100 will be described below as a domain name resolution system, it should be understood that the network address name resolution system 100 can have other applications, including acting as an e-mail user account name resolution system. Other applications of the network address name resolution system 100 will be apparent to those skilled in the art, and are encompassed by the present invention.

Figure 2:
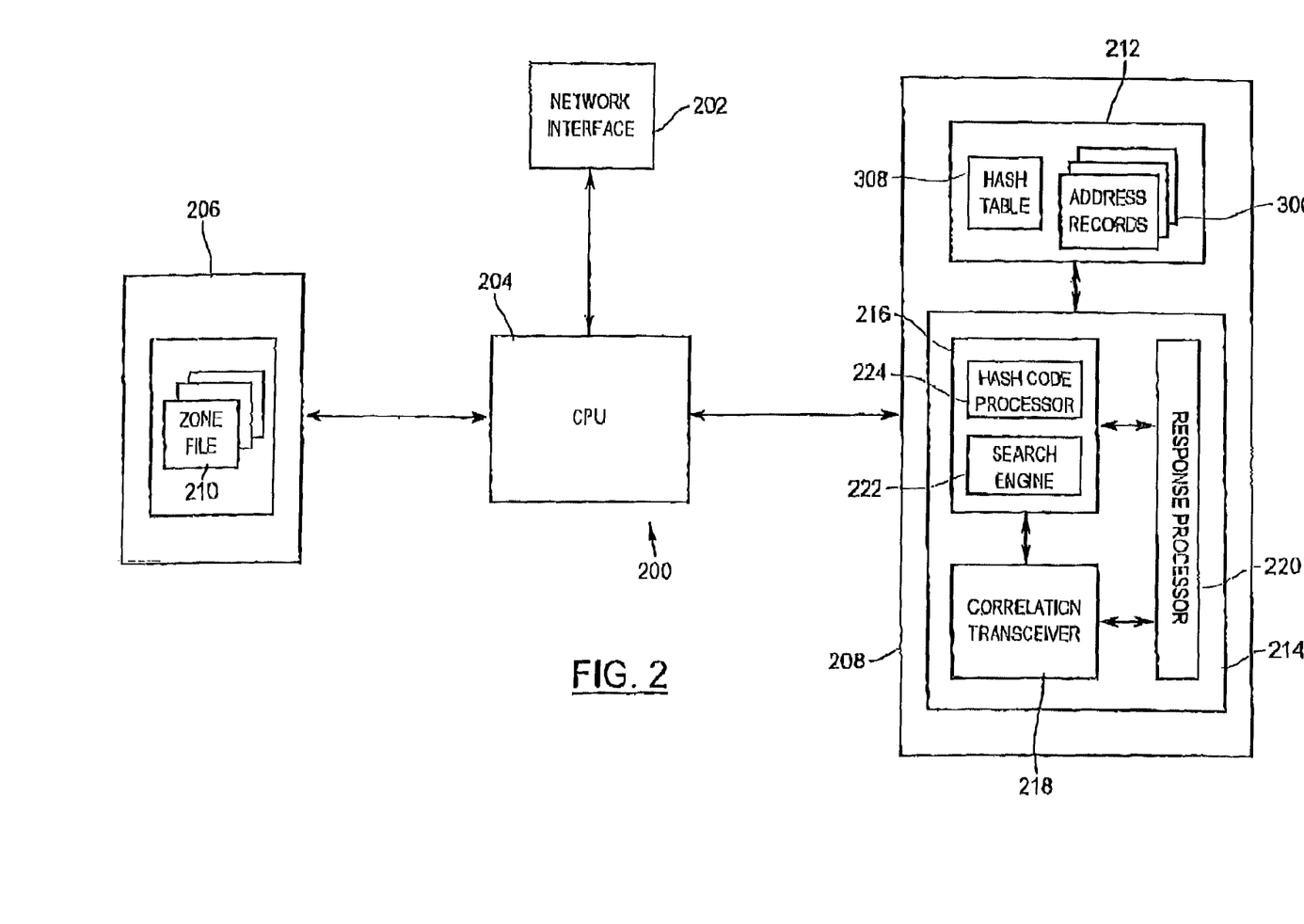
FIG. 2 is a schematic view of the network address server shown in FIG. 1, depicting the address name database, and the correlation processor, the correlation transceiver and the response processor of the address name processor.

As shown in FIG. 2, each network address server 200 comprises a network interface 202 for communicating with the network clients 102 over the communications network 106, and a central processing unit (CPU) 204 in communication with the network interface 202, and a non-volatile memory (NVM) 206 and a volatile memory (RAM) 208 in communication with the CPU 204. Preferably the NVM 206 comprises a magnetic or optical storage device, and includes a zone file 210 which has records associating domain names with network addresses. The NVM 206 also includes processor instructions for the CPU 204 which establish in the RAM 208 a network address name database 212 as a copy of the zone file 210, and a memory object defining an address name processor 214 in communication with the address name database 212. As will be appreciated, the network address name database 212 is established in the RAM 208 to increase the speed of the resolving process and may be dispensed with in applications where speed is not a paramount concern.

In accordance with the present structure of the Internet, the domain names of the network servers 104 (each of which is associated with a particular network address and comprises a plurality of domain name labels) together define a hierarchical network address name space having a plurality of address name space levels. For instance, generic top-level domain name labels, such as COM, EDU, MIL, NET, ORG, and country-specific top-level domain name labels, such as CA, UK, JP etc. each reside in the uppermost level of the network address name space. Below each top-level domain name label reside a plurality of second level domain name labels, and below each second level domain name label typically reside at least one lower level domain name label. The address name database 212 of each network address server 200 includes a plurality of database records 300, each defining a unique region of the address name space level.

To enhance the speed of the resolution process, preferably each level of network address name space is distributed across a plurality of different network address servers 200, with each address name database 212 being associated with a unique subset of the domain name labels defined for a particular address name space level. In essence, each network address server 200 is associated with a unique region of the entire address name space, with the address name databases 212 of all the network address servers 200 associated with a particular address name space level together identifying all the domain name labels defined for the associated address name space level. However, consistent with the existing DNS structure, preferably the network address name resolution system 100 includes redundant or secondary network address servers 200, so that each unique region of the address name space is serviced by two or more network address servers 200.

The structure of typical database records 300a, 300b, 300c, 300d are shown in text format in FIG. 3. As will be apparent, the database records 300 are substantially similar to the BIND-based text zone file resource records presently used in the DNS described by Mockapetris, in that each database record 300 includes an address name label identifying a particular domain name, and at least one network address 304 associated with the address name label 302. In accordance with the existing DNS convention, each network address 304 is either (1) a network address server network address 304a of a network address server 200 which contains in its address name database 212 a network address name associated with the next lowermost level of the network address name space, or (2) the domain name network address 304b of the domain name being resolved.

However, unlike the ASCII text used in existing BIND-based zone file records, to overcome the character set limitation inherent in the conventional domain name system preferably each address name label 302 is defined using characters from the Unicode character set (ISO 10646), since the Unicode character set includes symbols and characters from a number of different languages. However, to avoid limiting the network address name resolution system 100 to any particular character set, it is envisaged that each address name label 302 may use characters from any of a plurality of character set. Therefore, preferably each database record 300 also includes a character set identifier identifying the character set type used to define the address name label 302.

Figure 3A:
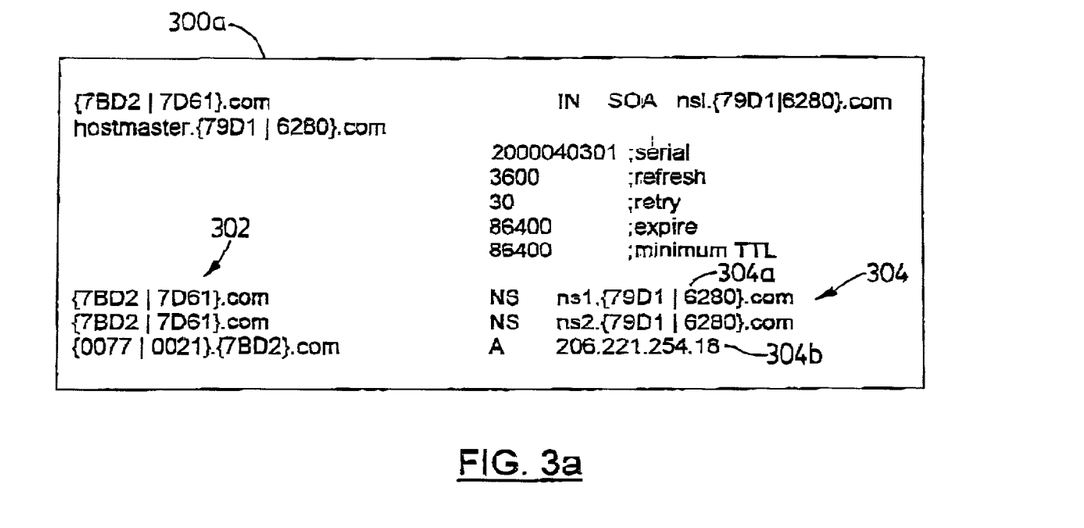
FIGS. 3a to 3d are schematic views of sample database records comprising the address name database shown in FIG. 2.
Figure 3B:
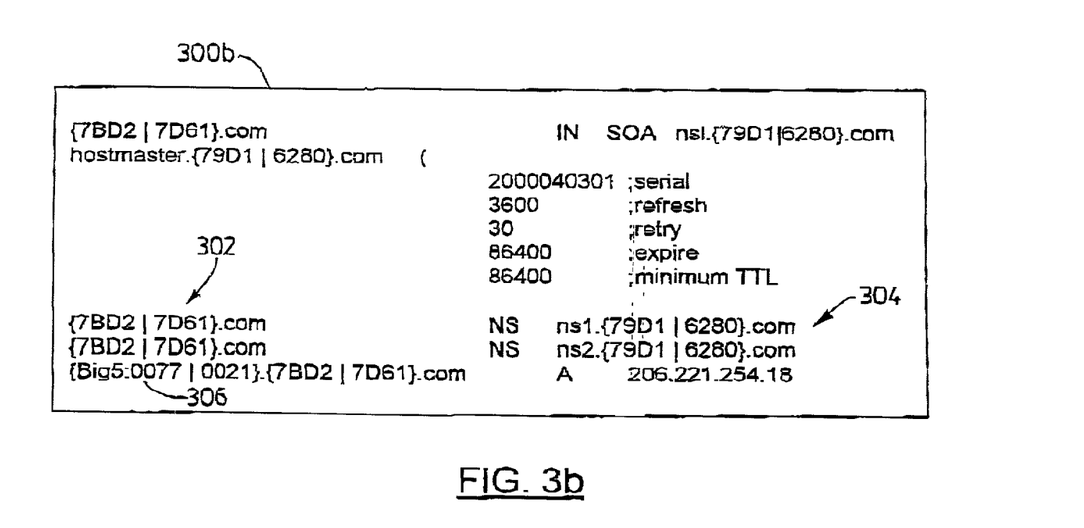
Figure 3C:
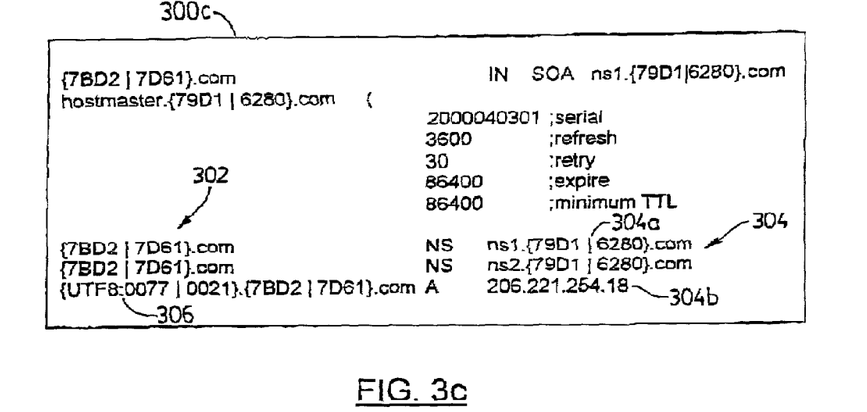
Figure 3D:
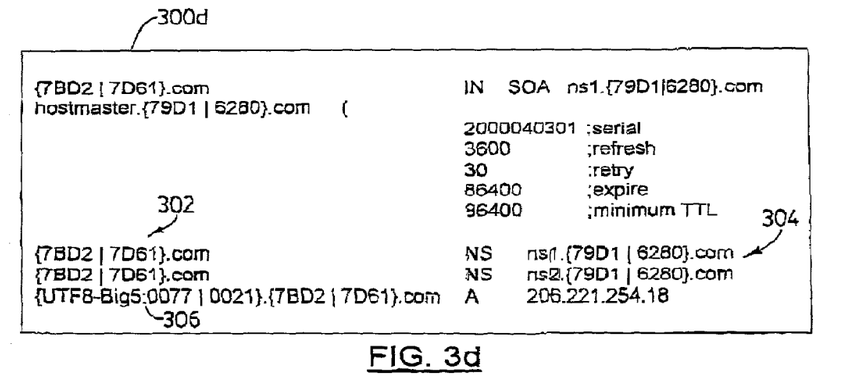

For instance, the database record 300b includes as the characters set identifier 306 the string "Big5" to denote the Big5 Chinese character set, whereas the database record 300c includes as the character set identifier 306 the string "UTF8" to denote the UTF8 double-byte Chinese character set. Further, the Chinese language extension for the Microsoft Internet Explorer browser incorrectly treats each UTF8 double-byte character as two separate characters, thereby providing an incorrect transformation of UTF8 characters. Therefore, the database record 300d includes as the character set identifier 306 the string "UTF8-BIG5" to transparently provide Internet Explorer users with the correct resolution of domain names defined by UTF8 characters. In addition, preferably each database record 300 also includes as the character set identifier 306 the string "UTF7" to interface with name resolution servers 250 which are not 8-bit compliant.

As shown in FIG. 2, in one variation the address name database 212 also includes a hash table 308 having a plurality of hash values, each derived from a respective one of the address name labels 302. As will be explained, the hash table 308 improves the speed of the domain name resolution process and may be eliminated if speed is not a paramount concern, or if the address name database 212 does not contain a large number of records 300.

The sample database records 300, depicted in FIGS. 3a to 3d, each have a different character set identifier 306, and corresponding address name label 302, associated with the same network address 304. Rather than including a separate database record 300 for each combination of character set identifier 306 and address name label 302, in other variation one or more of the database records 300 include a plurality of alias address name labels 302, each being associated with a different character set identifier 306, with each database record 300 of alias address name labels being associated with a unique network address 304. By associating each network address 304 with one or more alias address name labels 302, the network address server 200 is able to resolve more readily an address name defined using any of a plurality of different character sets. For instance, the database records 300a, 300b, 306c and 300d could be combined into a single database record 300, all being associated with a common network address 304, but having one address name label 302 defined using characters from the Unicode character set, an alias address name label 302 defined using characters from the Big5 Chinese character set (and including as the character set identifier the string "Big5"), another alias address name label 302 defined using characters from the UTF8 double-byte Chinese character set (and including as the character set identifier the string "UTF8"), another alias address name label 302 for dealing with the Chinese language extension for Microsoft Internet Explorer (and including as the character set identifier the string "UTF8-Big5"), and another alias address name label 302 for dealing with name resolution servers 250 which are not 8-bit compliant (and including as the character set identifier the string "UTF7").

Figure 4:
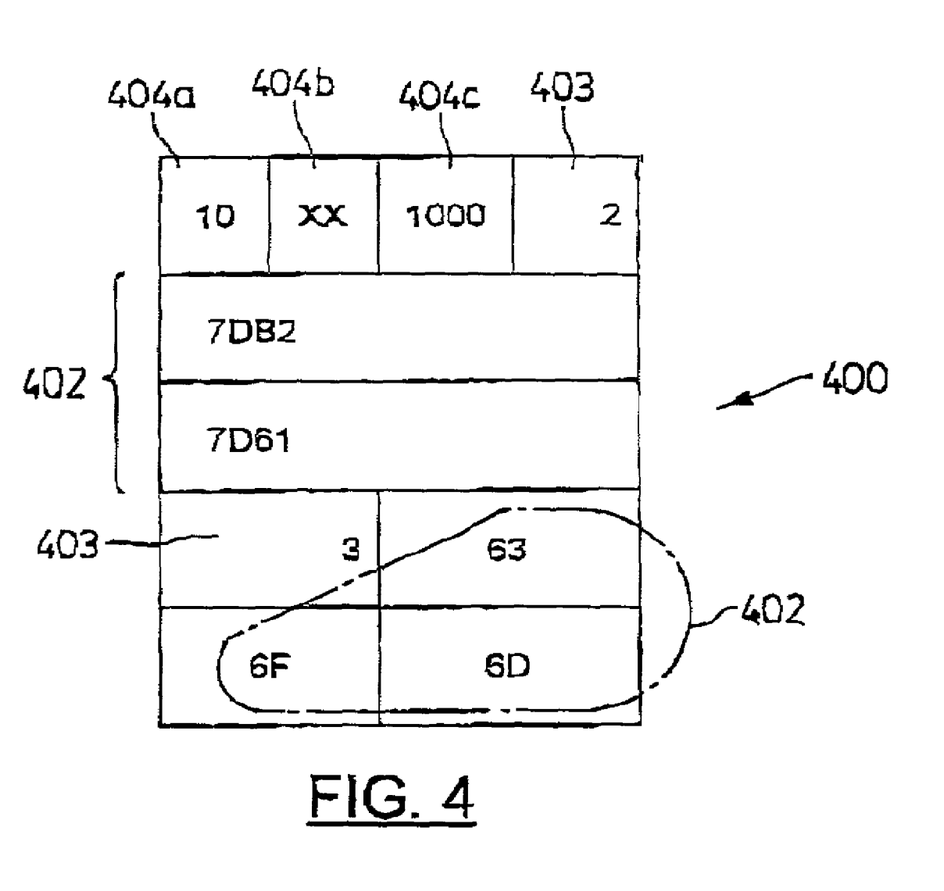
FIG. 4 is a schematic diagram of a data packet used to query the name network address servers.

A portion of a data packet 400 for querying the network address servers 200 with a target domain name, is shown in FIG. 4. The structure of the overall data packet 400 is substantially similar to the datagram message format described by Mockapetris for conventionally DNS queries, in that the data packet includes the HEADER, QUESTION, ANSWER, AUTHORITY AND ADDITIONAL records (not shown). Further, as described by Mockapetris, the QUESTION, ANSWER, AUTHORITY AND ADDITIONAL records comprise one or more of the QNAME, QTYPE, QCLASS, TTL, RDLENGTH and RDATA fields (not shown).

Further, as proposed by Mockapetris, the QNAME field includes a target domain name label 402 identifying the target domain name, and an 8-bit character count identifier 403 preceding the target domain name label 402 which identifies the number of characters in the domain name label. However, rather than each target domain name comprising only ASCII characters, as proposed by Mockapetris, preferably each target domain name label 402 is defined using characters from the Unicode character set. On the other hand, as discussed above, to avoid limiting the network address name resolution system 100 to any particular character set, it is envisaged that each target domain name label 402 may use characters from any of a plurality of character sets. Therefore, preferably each data packet 400 also includes a 16-bit character set identifier 404 identifying the character set type used to define the target domain name label 402. As shown, the character set identifier 404 includes a 2-bit prefix portion 404a which indicates to the network address server 200 that the data packet 400 includes non-ASCII characters, a 2-bit flag portion 404b for further enhancement purposes, and a 12-bit code portion 404c which identifies the character set type.

Preferably, the code portion 404c uses a standardized specification for the identification of the character set, such as the MIBenum specification proposed in RFC 1700. Thus, as will be apparent from RFC 1700, the value "1000" as used in the code portion 404c denotes that the following domain name label is composed of characters from the Unicode character set. However, as one goal of the network address name resolution system 100 is to promote the use of a common character set capable of recognizing any multi-national characters, it is expected that the 12-bit code portion 404c, the 2-bit prefix portion 404a and the 2-bit flag portion 404b may be eliminated altogether once all network resolution address servers 200 adopt a common character set for the representation of domain name labels. On the other hand, it is also expected that domain name labels may comprise symbols which are not part of any recognized character set, such as a graphic representation or logo which is being used as a trade-mark, in which case the code portion 404c would be retained to identify the character set associated with the symbol.

As shown in FIG. 4, preferably the 2-bit prefix portion 404a is set to "10" to identify that the following domain name label includes non-ASCII characters. However, as will be apparent from RFC 1035, since a domain name label is limited to 63 octets in length, the two most significant bits of the 8-bit character counter identifier 403 will typically be "00". Therefore, to promote compatibility with the DNS standard described by Mockapetris and to promote backwards compatibility with prior art name resolution servers 250 (which do not recognize non-ASCII characters), if the target domain name label 402 consists only of ASCII characters preferably the 16-bit character set identifier 404 which would otherwise precede the character count identifier 403 for the domain name label 402 would be eliminated. For example, the final two "rows" of data in the data packet 400 only include the 8-bit character counter identifier 403 (identifying that the last domain name label in the domain name has 3 ASCII characters) and a target domain name label 402 whose characters together define the "com" domain name label. Consequently, since the two most significant bits of the 8-bit character counter identifier 403 will not be "10" for a domain name label consisting only of ASCII characters, name resolution servers 250 will be able to resolve such a domain name label without modification to the prior art DNS algorithm.

Turning again to FIG. 2, the address name processor 214 (which is in communication with the address name database 212) is shown comprising a correlation processor 216, a correlation transceiver 218 in communication with the correlation processor 216, and a response processor 220 in communication with the correlation processor 216 and the correlation transceiver 218. The correlation processor 216 is configured to determine a correlation between the domain name label 402 being resolved and the unique address name region associated with the particular network address server 200. In other words, the correlation processor 216 of each network address server 200 is configured to determine whether a target domain name label 402 (as queried by one of the network clients 102) has a corresponding entry in the network address server's 200 address name database 212.

The correlation processor 216 is configured to determine the correlation between the target domain name label 402 and the network address server's 200 assigned unique domain name region by querying the database records 300 of the network address server 200 with the target domain name label 402, and then comparing the domain name characters and the associated domain name character set identifier 404 with the record characters (of the address name label 302) and the associated record character set identifier 306. As will be apparent, the correlation processor 216 continues to analyse each database record 300 until either a matching database record 300 is located in the respective address name database 212 or until all the database records 300 in the respective address name database 212 have been analyzed. If the address name database 212 includes one or more alias address name labels 302, the correlation processor 216 analyzes each database record 300 until all database records 300 have been analyzed, or until a database record 300 is located in which the address name label 302 or alias address name label(s) 302 (and the associated character set identifier 306) matches the character sequence of the target domain name label 402 (and the associated domain name character set identifier 404).

The correlation processor 216 includes a search engine 222 for querying the database records with the domain name label. However, in the variation, discussed above, where the address name database 212 includes the hash table 308, preferably the correlation processor 216 also includes a hash code processor 224 for encoding the target domain name label with the hashing function, with the search engine 222 being in communication with the hash code processor 224 for querying the hashed database records with the hashed domain name label. In this variation, the correlation processor 216 obtains the correlation by encoding the target domain name label with the hashing function used to create the hash table 308, and then querying the hashed database records 300 with the hashed domain name label 402.

The correlation transceiver 218 of each network address server 200 is configured to provide the other network address server 200 with a respective indication of the determined correlation, and to receive corresponding correlation indications from at least one of the other network address servers 200. The response processor 220 is configured to provide a response to the query in accordance with the correlation indications.

Figure 5:
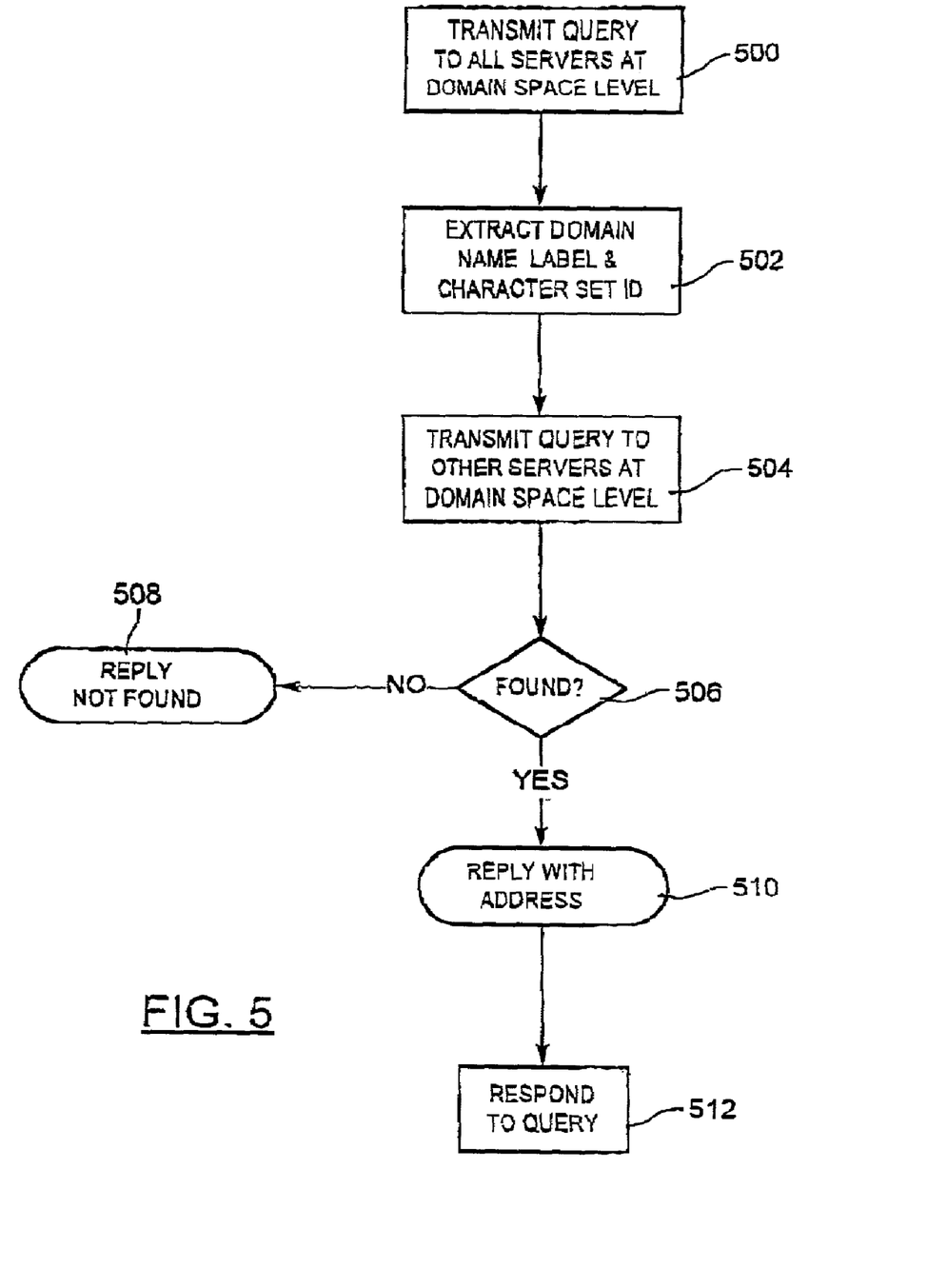
FIG. 5 is a flow chart depicting the sequence of steps executed by the network address server in resolving a target network address name label with a network address.

The operation of the network address name resolution system 100 will now be described with reference to FIG. 5. To demonstrate the resolution process, the name "www.Φ.com" will be used as the target domain name, as processed by one of the network address servers 200. As will be apparent, all of the network address servers 200 of the network address name resolution system 100 function in a similar manner.

Once the network address servers 200 are deployed, upon power-up each network address server 200 reads its zone file 210 from its NVM 206 and creates (as a copy) its network address name database 212 in its RAM 208. Then, at step 500, using a data packet 400 similar to that shown in FIG. 4, one of the network clients 102 transmits a target domain name query request (to communicate with one of the network servers 104) to one of the name resolution servers 250 for resolution of the target domain name to a network address. As discussed above, if the network client 102 is compliant with the name resolution protocol disclosed herein, since the target domain name includes the character "Φ", the two most significant bits of the 8-bit character counter identifier 403 will be "10".

Upon receipt of the data packet 400, the name resolution server 250 transmits the query to all the network address servers 200 associated with the top-level of the address name space. In this example, the query is transmitted to the root network address servers 200 for identification of the network address of one of the network address servers 200 assigned to the "COM" domain name space. The network interface 202 of the top-level network address servers 200 receive the query, and transmit the query to their respective address name processors 214. At step 502, the address name processor 214 of each top-level network address server 200 extracts the target domain name label 402 and the associated character set identifier 404 from the data packet 400. The address name processor 214 then determines the correlation between the target address name label 402 and the unique address name region assigned to tho respective network address server 200.

To do so, at step 504 preferably the correlation processor 216 of the top-level network address server 200 which is first to receive and process the domain name query (hereinafter the "first top-level network address server 200") transmits the query to the other top-level network address servers 200 to the other top-level network address servers 200, with a flag indicating that these other top-level network address servers 200 should transmit their respective responses to the first top-level network address server 200. Besides increasing the speed of the resolution process, as will be explained below, this step ensures that the network client 102 will only receive a single response to the domain name query.

After the notification is sent, at step 506 the hash code processor 224 of the correlation processor 216 of each top level network address server 200 derives a hash code from the extracted target domain name label 402 and the associated character set identifier 404. The search engine 222 of the correlation processor 216 of each top level network address server 200 then queries the database records 300 of their respective network address name databases 212 with the derived hash code for a matching entry in their network address name database 212. If no match is located, at step 508 the correlation transceiver 218 of each of the top-level network address servers 200 provides the first top-level network address server 200 with a data packet indicating that the domain name was not found in the network address server's address name database 212. As will be apparent, if the database records 300 include one or more alias address name labels 302, the correlation processor 216 of each top-level network address server 200 queries the address name database 212 for a database record 300 having an address name label 302 (or alias address name label 302) and associated character set identifier 306 which matches the character sequence of the target domain name label 402 and the associated domain name character set identifier 404.

On the other hand, if a match is located, at step 510 the top-level network address server 200 having the matching entry replies to the first top-level network address server 200 with the network address of one of the network address servers 200 assigned to the "com" domain name space. Alternately, if the top-level network address server 200 has an authoritative record for the domain name, the network address server 200 replies to the first top-level network address server 200 with the network address associated with the domain name.

At step 512, the first top-level network address server 200 responds with the retrieved network address to the name resolution server 250 which initiated the query. If the first top-level network address server 200 only responded with the network address of one of the network address servers 200, the name resolution server 250 transmits the query to the network address servers 200 having the retrieved network address. The process repeats in accordance with steps 500 to 512, but with the query being transmitted to the "com" network address servers 200 for identification of the network address of one of the network address servers 200 assigned to the "Φ.com" domain name space. As will be appreciated, at step 512 the first "com" network address server 200 responds to the network client 102 which initiated the query either with the network address of one of the network address servers 200 assigned to the "Φ.com" domain name space, or the retrieved network address.

Again, the process repeats in accordance with steps 500 to 512, but with the query being transmitted to the "Φ.com" network address servers 200 for identification of the network address of one of the network address servers 200 assigned to the "www.Φ.com" domain name space. At step 512, the first "Φ.com" network address server 200 responds to the name resolution server 250 which initiated the query either with the network address associated with the target domain name, or with a indication that the target domain name was not found. The network client 102 then transmits the response to the network client 102 to allow the network client 102 to establish communication with the target network server 104.

If at any iteration of step 512, no response is received from any of the other network address servers 200 and a matching entry cannot be found by the first network address server, the first network address server responds to the name resolution server 250 at step 512 with a time out error.

The present invention provides a number of advantages of the prior art. First, by separating each level of the domain name space into distinct portions, and assigning each domain name portion to different network address servers 200, the number of domain names available is no longer limited by the hardware restrictions of any one domain name server. Second, by distributing the domain name space amongst multiple network address servers 200, startup costs for establishing a network address server 200 is reduced. Third, by using the Unicode character set, rather than the ASCII character set used by conventional domain name servers, the number of domain names can be greatly enhanced. Fourth, by using a character set identifier to identify the character set of a domain name label, the network address name resolution system 100 can be readily configured to recognize new character sets and to accept enhancements to existing character sets. Further, by employing the network address servers 200 as account network address servers in an e-mail system, the type of characters which can be used for the account names assigned to an e-mail account can also be greatly enhanced.

The present invention is defined by the claims appended hereto, with the foregoing description being illustrative of the preferred embodiment of the invention. Those of ordinary skill may envisage certain additions, deletions and/or modifications to the described embodiment, which although not explicitly described herein, do not depart from the spirit or scope of the invention, as defined by the appended claims.

We claim:

1. A network address server for resolving a target domain name label with a network address in response to a query, the network address server being one of a plurality of network address servers, each being associated with a common name space level of a multi-level network address name space, the network address server comprising:

an address name database associated with a subset of address names of the common name space level, the address name database including a plurality of database records, each said database record including an address name label and a network address uniquely associated with the address name label; and an address name processor in communication with the address name database, the address name processor including:

a correlation processor for determining a correlation between the target domain name label and the subset of the address names of the common name space level, a correlation transceiver configured to communicate with a correlation processor of at least one of the other network address servers, for receiving an indication of a correlation from the at least one other network address server, and a response processor in communication with the correlation processor and the correlation transceiver, for providing an output signal corresponding to a response to the query in accordance with the determined correlation.

2. The network address server according to claim 1, wherein the address name database includes for each said database record a hash code derived from a hashing function uniquely associating the derived hash code with the corresponding address name label.

3. The network address server according to claim 2, wherein the correlation processor comprises a hash code processor for encoding the target domain name label with the hashing function, and a search engine in communication with the correlation processor for querying the hashed database records with the hash domain name label.

4. The network address server according to claim 1, wherein each said database record includes at least one record character having a record character set type, and a record character set identifier identifying the record character set type.

5. The network address server according to claim 1, wherein a subset of the address names of the common name space level comprises Big5 address names.

6. The network address server according to claim 1, wherein a subset of the address names of the common name space level comprises Unicode address names.

7. The network address server according to claim 1, wherein a subset of the address names of the common name space level comprises UTF-8 address names.

8. The network address server according to claim 1, wherein a subset of the address names of the common name space level comprises ASCII address names.

9. A method for resolving a target domain name label with a network address in a multi-level network address name space, the method comprising the steps of:
   receiving at a first network address server a query for the network address corresponding to the target domain name label, the first network address server being one of a plurality of network address servers each being associated with a common name space level of the network address name space, the network address servers each defining a subset of address names of the common name space level, each address server including a plurality of database records, each said database record including an address name label and a network address uniquely associated with the address name label;
   at the first network address server, determining a correlation between the received target domain name label and the corresponding subset of address names of the common name space level;
   at the first network address server, receiving an indication of a correlation from at least one of the other network address servers; and
   at the first network address server, providing an output signal corresponding to a response to the query in accordance with the determined correlations.

10. The method according to claim 9, wherein each said network address server has a correlation response time, and the first network address server has a shortest one of the correlation response times.

11. The method according to claim 9, wherein the database records each include at least one record character having a record character set type, and a record character set identifier identifying the record character set type, the target domain name label includes at least one address name character having an address name character set type, and an address name character set identifier identifying the address name character set type, and the step of determining a correlation comprises the steps of querying the respective database records with the received address name label, and obtaining a correlation of the at least one address name character and the associated address name character set identifier with each said at least one record character and the associated record character set identifier.

12. The method according to claim 11, wherein the database records are encoded with a hashing function, and the step of obtaining a correlation comprises the steps of encoding the target address name label with the hashing function, and querying the hashed database records with the hashed address name label.

13. The method according to claim 9, wherein a subset of the address names of the common name space level comprises Big5 address names.

14. The method according to claim 9, wherein a subset of the address names of the common name space level comprises Unicode address names.

15. The method according to claim 9, wherein a subset of the address names of the common name space level comprises UTF-8 address names.

16. The method according to claim 9, wherein a subset of the address names of the common name space level comprises ASCII address names.

17. A method for resolving network domain names comprising the steps of:
   providing a plurality of network address servers for mapping a hierarchical network address name space, the hierarchical address name space having a plurality of levels, each said network address server being associated with at least one other of said network address servers and a common name space level of the network address name space, each said network address server including database records defining a subset of address names of the associated common name space level, each said database record including an address name label and a network address uniquely associated with the address name label;
   receiving at one of the network address servers a target domain name for resolving, the target domain name comprising a plurality of address name labels, each said address name label being associated with one of the subset of address names of a respective one of the common name space levels; and
   for each said address name label, querying the plurality of network address servers defining the one common name space level.

18. The method according to claim 17, wherein the step of receiving the network address comprises the steps of:
   at each said queried network address server, determining a correlation between the queried address name label and the respective defined address name space subset;
   providing other ones of the queried network address servers with an indication of the correlation and receiving correlation indications from the other queried network address servers; and
   transmitting a response to the query in accordance with the correlation indications.

19. The method according to claim 18, wherein each said queried network address server has a correlation indication response time, and the step of transmitting a response comprises transmitting the response from the queried network address server having a shortest one of the correlation indication response times.

20. The method according to claim 18, wherein the database records each include at least one record character having a record character set type, and a record character set identifier identifying the record character set type, the queried address name label includes at least one address name character having an address name character set type, and an address name character set identifier identifying the address name character set type, and the correlation determining step comprises the steps of receiving the queried address name label, and querying the respective database records with the at least one address name character and the associated address name character set identifier for obtaining a respective correlation with each said at least one record character and the associated record character set identifier.

21. The method according to claim 20, wherein the database records are encoded with a hashing function, and the step of querying the respective database records comprises the steps of encoding with the hashing function each queried address name label, and querying the hashed database records with the hashed address name labels.

22. Computer network apparatus for resolving a domain name with a network address, comprising:
   a first network address server storing a first address name database, the first address name database comprising (i)

a first plurality of domain names for a computer network domain, and (ii) a plurality of network addresses respectively corresponding to the first plurality of domain names, the first plurality of domain names corresponding to an ASCII character set;

the first network address server including a first address name processor configured to provide a reply when a received inquiry requests a domain name resident in the first address name database;

a second network address server in communication with said first network address server and storing a second address name database, the second address name database comprising (i) a second plurality of domain names for the computer network domain, and (ii) a plurality of network addresses respectively corresponding to the second plurality of domain names, the second plurality of domain names corresponding to a non ASCII character set; and the second network address server including a second address name processor configured to provide a reply when the received inquiry requests a domain name resident in the second address name database.

* * * * *